US008171473B2

(12) United States Patent
Lavin

(10) Patent No.: US 8,171,473 B2
(45) Date of Patent: May 1, 2012

(54) METHOD AND APPARATUS FOR DETERMINING A SERVICE CLUSTER TOPOLOGY BASED ON STATIC ANALYSIS

(75) Inventor: Matthew David Lavin, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1278 days.

(21) Appl. No.: 11/848,677

(22) Filed: Aug. 31, 2007

(65) Prior Publication Data

US 2009/0064137 A1    Mar. 5, 2009

(51) Int. Cl.
*G06F 9/44* (2006.01)
*G06F 9/45* (2006.01)
*G06F 9/46* (2006.01)
*G06F 9/455* (2006.01)

(52) U.S. Cl. ............ 718/1; 718/100; 718/102; 718/103; 718/104; 717/118; 717/141

(58) Field of Classification Search ........................ None
See application file for complete search history.

(56) References Cited

U.S. PATENT DOCUMENTS

| 6,092,147 | A  | * | 7/2000  | Levy et al. ........................ 711/6 |
| 6,243,825 | B1 | * | 6/2001  | Gamache et al. .............. 714/4.4 |
| 6,546,454 | B1 |   | 4/2003  | Levy et al. |
| 6,640,279 | B2 |   | 10/2003 | Levy et al. |
| 6,851,109 | B1 |   | 2/2005  | Alexander et al. |
| 2002/0143842 | A1 | * | 10/2002 | Cota-Robles et al. ............ 709/1 |
| 2006/0130066 | A1 | * | 6/2006  | Bozak et al. ................... 718/104 |
| 2008/0250267 | A1 | * | 10/2008 | Brown et al. ..................... 714/4 |

OTHER PUBLICATIONS

Kim et al. Using Content-Addressable Networks for Load Balancing in Desktop Grids. [online] (Jun. 29, 2007). ACM, pp. 189-198. Retrieved From the Internet <http://portal.acm.org/citation.cfm?id=1272391>.*

* cited by examiner

*Primary Examiner* — Emerson Puente
*Assistant Examiner* — Jonathan R Labud
(74) *Attorney, Agent, or Firm* — Cuenot, Forsythe & Kim, LLC

(57) ABSTRACT

The service assignment tool analyzes a service to determine whether the service can execute on a cluster. If the service cannot execute on a cluster, the service is assigned to a single virtual machine. The service assignment tool identifies non-cluster friendly services by performing a static analysis on the bytecode of the service. The bytecode of the service is analyzed by comparing each segment of bytecode to a list of known good and bad coding conventions. If each segment of bytecode in a service meets the good coding convention criteria, then the service is cluster friendly. If one segment of bytecode does not meet the good coding convention criteria, then the entire service is considered to be not cluster friendly.

15 Claims, 3 Drawing Sheets

METHOD AND APPARATUS FOR DETERMINING A SERVICE CLUSTER TOPOLOGY BASED ON STATIC ANALYSIS

FIELD OF THE INVENTION

The present invention relates generally to data processing in a distributed computing environment and specifically to determining whether a service can execute on a cluster in the distributed computing environment.

BACKGROUND OF THE INVENTION

In a typical distributed computing environment, a client calls an application server with a request by sending a HTTP request from a web browser. The application server has a "master service" which receives the request, and assigns the request to be executed on a back-end server. The back-end server may be a "virtual machine" comprising a cluster of back end servers. An example of a master service is IBM's WebSphere®. The virtual machine is any physical or logical computer capable of executing the request. The master service attempts to distribute the workload across the "cluster" of back-end virtual machines in an efficient way. An efficient distribution prevents backlogs and improves response time.

A client request often requires a service. A service is a software application that performs a data manipulation to produce a response to the request. For example, a service could be a database query or a mathematical calculation. Often, a service performs a series of data manipulations. When a request is assigned to a virtual machine, the service required for execution of the request is loaded on the assigned virtual machine.

Services ideally are written to execute properly on a distributed environment. These robust, or "cluster friendly" services can be broken down into fragments, and each fragment can run on a different virtual machine and still produce a consistent, correct result. The ability to execute a service across a cluster enhances the ability of the master service to efficiently distribute the workload across the cluster. Developers generally follow good coding conventions and properly test their code prior to implementation to ensure that services are cluster friendly.

Sometimes, services are not "cluster friendly." Non-cluster friendly services will not execute properly if distributed across multiple virtual machines. Non-cluster friendly services may have run-time errors by violating security rules or by not propagating context needed to execute sequential steps or fragments. Distributing the execution of a service that is not cluster friendly may cause an incorrect response to a client request. Incorrect responses to a request may have other consequences such as dissatisfied customers or poor business decisions made on incorrect data.

A need exists for a way to prevent a non-cluster friendly service from being distributed across a cluster.

SUMMARY OF THE INVENTION

The invention meeting the need identified above is the "service assignment tool." The service assignment tool analyzes a service to determine whether the service can execute on a cluster. If the service cannot execute on a cluster, the service is assigned to a single virtual machine.

The service assignment tool identifies non-cluster friendly services by performing a static analysis on the bytecode of the service. The bytecode of the service is analyzed by comparing each segment of bytecode to a list of known good and bad coding conventions. If each segment of bytecode in a service meets the good coding convention criteria, then the service is cluster friendly. If one segment of bytecode does not meet the good coding convention criteria, then the entire service is considered to be not cluster friendly.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "service assignment tool" or "SAT."

Figure 1:
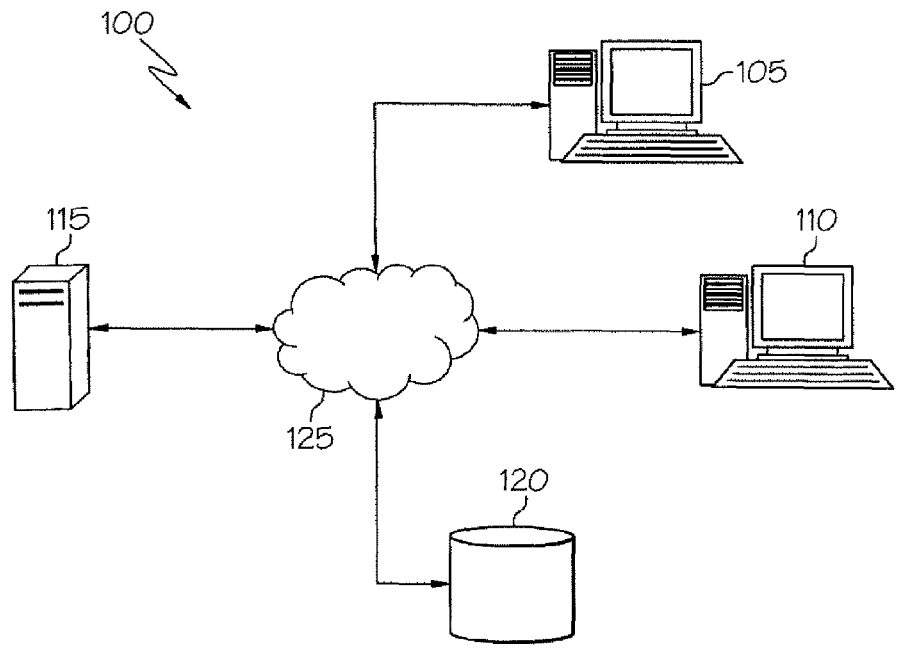
FIG. 1 is an exemplary computer network.

Additionally, the SAT is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
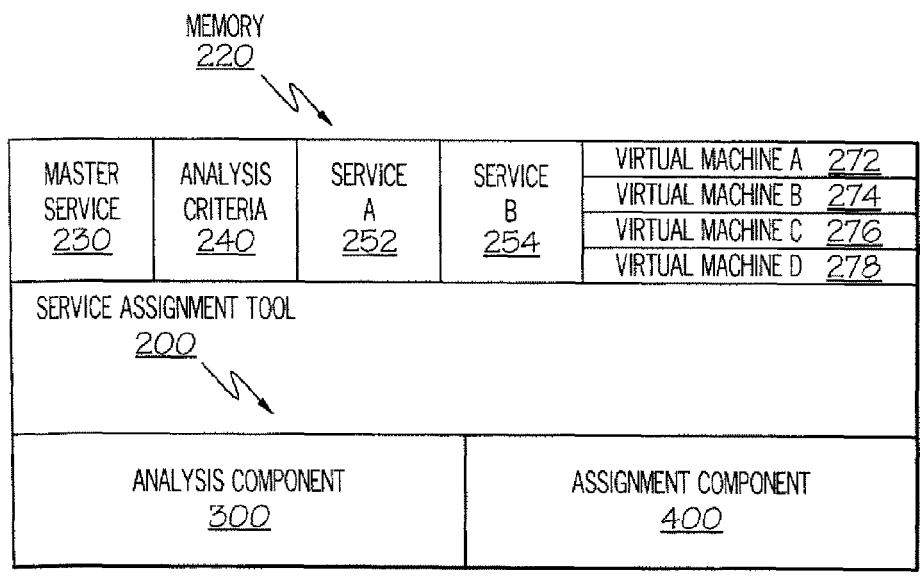
FIG. 2 describes programs and files in a memory on a computer.
Figure 3:
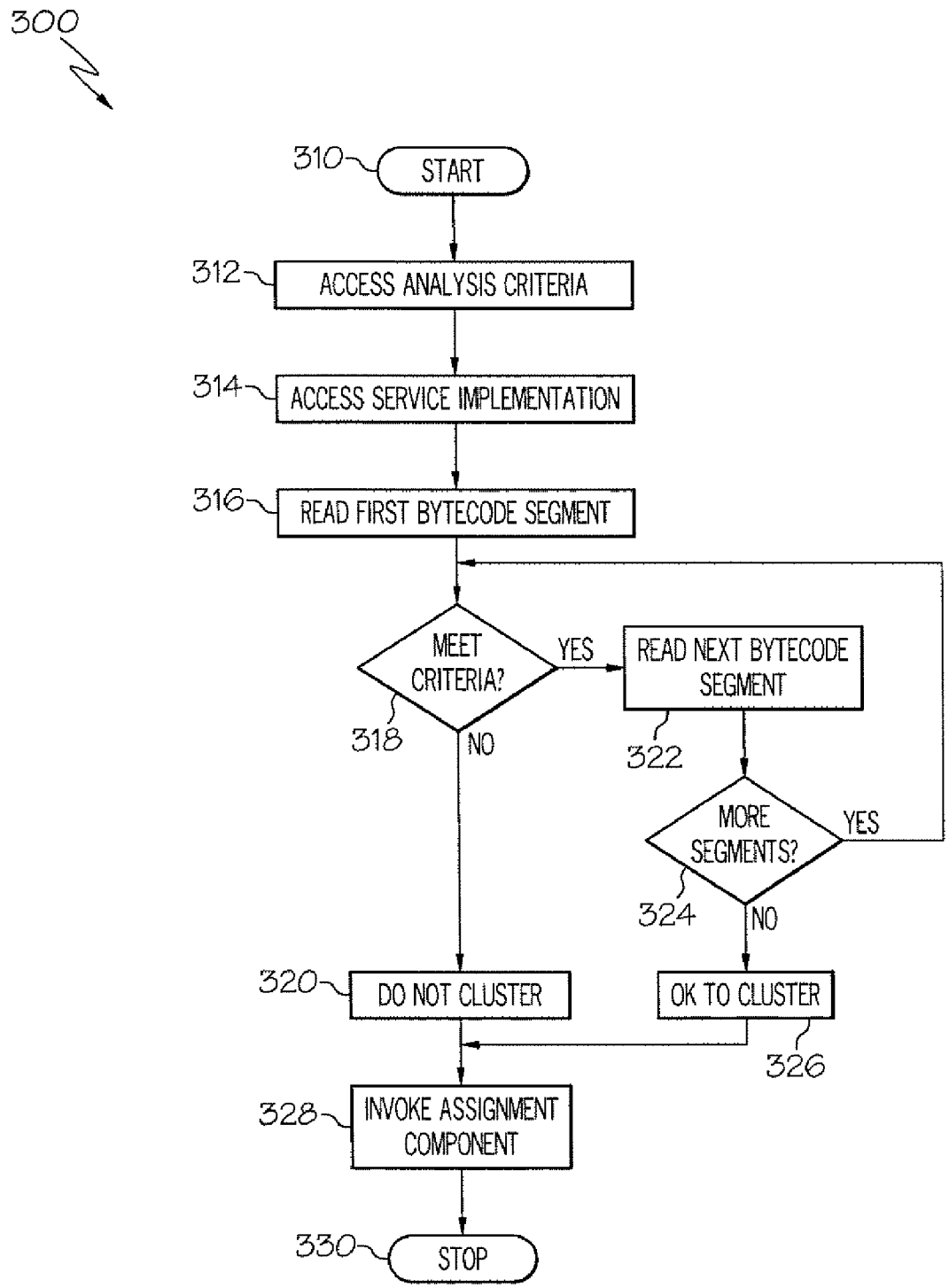
FIG. 3 is a flowchart of an analysis component.
Figure 4:
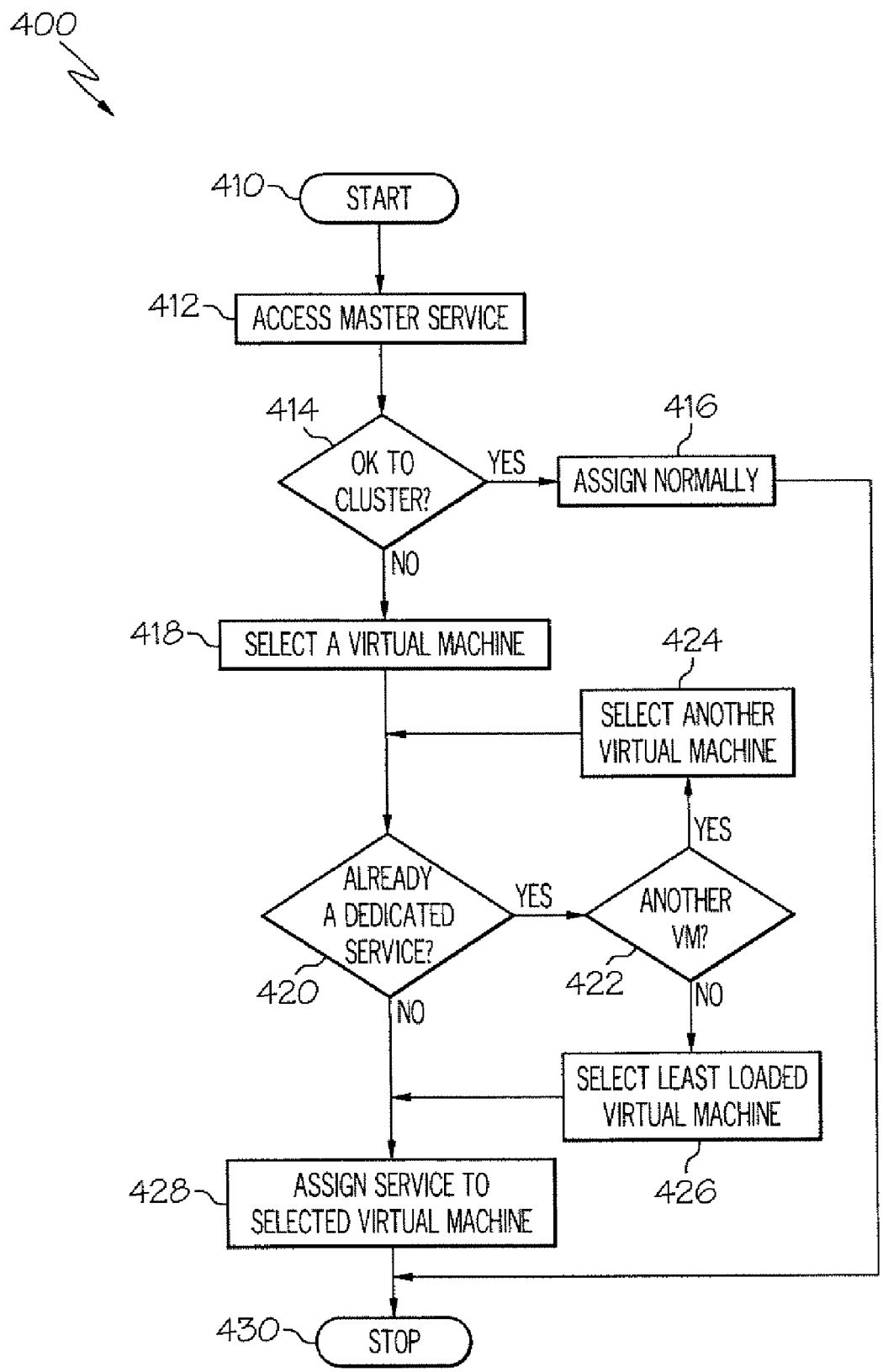
FIG. 4 is a flowchart of an assignment component.

SAT 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, SAT 200 may reside in more than one memory distributed across different computers, servers, logical partitions, or other hardware devices. The elements depicted in memory 220 may be located in or distributed across separate memories in any combination, and SAT 200 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, memory 220 includes SAT 200, comprising analysis component 300 and assignment component 400. Memory 220 further includes additional data and programs with which SAT 200 interacts. Of particular import to SAT 200, memory 220 includes master service 230, analysis criteria 240, service A 252, service B 254, virtual machine A 272, virtual machine B 274, virtual machine C 276, and virtual machine D 278.

Analysis component 300 starts (310) when a request is received. Analysis component 300 accesses analysis criteria 240 (312) and accesses service implementation (314) such as exemplary service A 252 or exemplary service B 254. Analysis component 300 reads the first bytecode segment (316) and determines whether the bytecode segment meets the criteria (318). If the bytecode segment does not meet the criteria, then analysis component 300 marks the request as do not cluster (320). If the bytecode segment meets the criteria, then analysis component 300 reads the next bytecode segment (322). When there are more bytecode segments (324), analysis component returns to step 318 and determines whether the bytecode segment meets the criteria (318). When there are no more bytecode segments, and all bytecode segments have met the criteria, analysis component 300 identifies the request as being alright to cluster (326). Analysis component 300 then invokes assignment component 400 (328) and stops (330). Persons skilled in the art are aware that there are multiple ways to analyze bytecode. For example, an analysis of bytecodes in the service request would follow each of a plurality of different paths that the execution of service request could take, and verify that bytecodes along each path are compatible with a cluster.

Assignment component 400 starts (410) and accesses master service 230 (412). Assignment component 400 determines whether the request is marked alright to cluster (414). If it is marked alright to cluster, then the request is assigned normally (416) and assignment component stops (430). If the request is not marked alright to cluster, then assignment component selects a virtual machine (418). Assignment component 400 determines whether the selected virtual machine is already dedicated to a service (420). If the selected virtual machine is dedicated to a service, assignment component determines whether there is another virtual machine (422). If there is another virtual machine, another virtual machine is selected (424) and assignment component returns to step 420. If there is not another virtual machine, assignment component 400 selects the least loaded virtual machine (426). Assignment component assigns the service to the selected virtual machine (428) and stops (430).

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for assigning requested services in a distributed computing environment, comprising:
   accessing a bytecode implementation of a requested service;
   determining whether at least one bytecode segment in the bytecode implementation fails to meet a criteria to establish that the requested service is not cluster friendly; and
   upon a determination that the requested service is not cluster friendly, selecting a virtual machine in the distributed computing environment for the requested service.

2. The computer implemented process of claim 1, further comprising:
   determining whether the selected virtual machine is already dedicated to another service.

3. The computer implemented process of claim 2, further comprising:
   upon a determination that the selected virtual machine is not already dedicated, assigning the requested service to the selected virtual machine.

4. The computer implemented process of claim 2, further comprising:
   upon a determination that the selected virtual machine is already dedicated, newly selecting another virtual machine in the distributed computing environment for the requested service.

5. The computer implemented process of claim 4, further comprising:
   upon a determination that no other virtual machines in the distributed computing environment are available for selecting, assigning the requested service to a least loaded virtual machine.

6. An apparatus for assigning requested services in a distributed computing environment, comprising:
   a processor;
   a memory connected to the processor;
   a service assignment tool application executing in the processor, wherein the service assignment tool application is configured for:
     accessing a bytecode implementation of a requested service;
     determining whether at least one bytecode segment in the bytecode implementation fails to meet a criteria to establish that the requested service is not cluster friendly; and
     upon a determination that the requested service is not cluster friendly, selecting a virtual machine in the distributed computing environment for the requested service.

7. The apparatus of claim 6, wherein the service assignment tool is further configured for
   determining whether the selected virtual machine is already dedicated to another service.

8. The apparatus of claim 7, wherein the service assignment tool is further configured for
   upon a determination that the selected virtual machine is not already dedicated, assigning the requested service to the selected virtual machine.

9. The apparatus of claim 7, wherein the service assignment tool is further configured for
   upon a determination that the selected virtual machine is already dedicated, newly selecting another virtual machine in the distributed computing environment for the requested service.

10. The apparatus of claim 9, wherein the service assignment tool is further configured for
upon a determination that no other virtual machines in the distributed computing environment are available for selecting, assigning the requested service to a least loaded virtual machine.

11. A computer readable storage device having stored therein computer readable program instructions for assigning requested services in a distributed environment, the computer readable program instructions, which when executed on a computer hardware system, causes the computer hardware system to perform:
accessing a bytecode implementation of a requested service;
determining whether all bytecode segments in the bytecode implementation meet a criteria to establish that the requested service is not cluster friendly; and
upon a determination that the requested service is not cluster friendly, selecting a virtual machine in the distributed computing environment for the requested service.

12. The computer readable storage device of claim 11, wherein the computer readable program instructions further cause the computer hardware system to perform:
accessing a master service.

13. The computer readable storage device of claim 12, wherein the computer readable program instructions further cause the computer hardware system to perform:
determining whether the selected virtual machine is already dedicated to another service.

14. The computer readable storage device of claim 12, wherein the computer readable program instructions further cause the computer hardware system to perform:
upon a determination that the selected virtual machine is already dedicated, newly selecting another virtual machine in the distributed computing environment for the requested service.

15. The computer readable storage device of claim 14, wherein the computer readable program instructions further cause the computer hardware system to perform:
upon a determination that no other virtual machines in the distributed computing environment are available for selecting, assigning the requested service to a least loaded virtual machine.

* * * * *